(12) United States Patent
Bagot, III

(10) Patent No.: US 12,525,633 B1
(45) Date of Patent: Jan. 13, 2026

(54) FLOW BATTERY FLUID EXCHANGE SYSTEM AND METHOD

(71) Applicant: Michael H. Bagot, III, New Orleans, LA (US)

(72) Inventor: Michael H. Bagot, III, New Orleans, LA (US)

( * ) Notice: Subject to any disclaimer, the term of this patent is extended or adjusted under 35 U.S.C. 154(b) by 0 days.

(21) Appl. No.: 18/749,909

(22) Filed: Jul. 9, 2024

(51) Int. Cl.
H01M 8/18 (2006.01)
H01M 8/04276 (2016.01)
H01M 8/04746 (2016.01)

(52) U.S. Cl.
CPC ....... *H01M 8/188* (2013.01); *H01M 8/04276* (2013.01); *H01M 8/04753* (2013.01)

(58) Field of Classification Search
CPC ............. H01M 8/188; H01M 8/04276; H01M 8/04753
USPC ........................................................ 429/122
See application file for complete search history.

(56) References Cited

U.S. PATENT DOCUMENTS

| | | | |
|---|---|---|---|
| 7,063,905 B2 | 6/2006 | Menon et al. | |
| 8,933,701 B2 | 1/2015 | Tennessen et al. | |
| 9,583,780 B2 | 2/2017 | Chiang et al. | |
| 10,790,530 B2 | 9/2020 | Kanno et al. | |
| 11,637,307 B2 * | 4/2023 | Modderno | H01M 8/2484 |
| | | | 429/105 |
| 11,777,120 B2 | 10/2023 | Tatsumi et al. | |
| 2004/0013918 A1 | 1/2004 | Merida-Donis | |
| 2007/0141450 A1 | 6/2007 | Yang et al. | |
| 2014/0193724 A1 | 7/2014 | Daniel et al. | |
| 2015/0093606 A1 * | 4/2015 | Chen | H01M 10/4214 |
| | | | 429/105 |
| 2016/0315337 A1 * | 10/2016 | Perry | H01M 8/0444 |
| 2019/0140301 A1 * | 5/2019 | Ikeuchi | H01M 8/04276 |
| 2023/0253584 A1 | 8/2023 | Song et al. | |
| 2024/0136551 A1 * | 4/2024 | Cooley | H01M 8/04186 |

FOREIGN PATENT DOCUMENTS

CN 108400366 A 8/2018

OTHER PUBLICATIONS

Chi-Yuan Lee 1, Chin-Lung Hsieh, Chia-Hung Chen, Yen-Pu Huang, Chong-An Jiang and Pei-Chi Wu, A Flexible 5-In-1 Microsensor for Internal Microscopic Diagnosis of Vanadium Redox Flow Battery Charging Process, Feb. 28, 2019.

(Continued)

*Primary Examiner* — Christian Roldan
(74) *Attorney, Agent, or Firm* — Intellectual Property Consulting, LLC; Stephen M. Kepper

(57) ABSTRACT

The flow battery system includes a positively charged tank comprising a positively charged electrolyte, a negatively charged tank comprising a negatively charged electrolyte, a cell stack comprising a positive electrode and a negative electrode separated by a membrane operable to allow permeation of an ion between the positive electrode and the negative electrode, a plurality of flow tubes connecting these components, a power source operable to provide an electric current to said electrodes, a pump operable to pump electrolyte throughout the system, and a drainage tube and diverter that tie into the existing system and utilize the existing system's power source and pumps to pump electrolyte into and out of the system to allow for routine maintenance and repairs.

14 Claims, 3 Drawing Sheets

(56) References Cited

OTHER PUBLICATIONS

Pavel Loktionov, Dmitry Konev, Roman Pichugov, Mikhail Petrov, Anatoly Antipov, Calibration-free coulometric sensors for operando electrolytes imbalance monitoring of vanadium redox flow battery, Jan. 1, 2023.

* cited by examiner

FLOW BATTERY FLUID EXCHANGE SYSTEM AND METHOD

FIELD

The present invention relates in general to batteries, and in particular, to flow battery systems.

BACKGROUND

A conventional flow battery consists of a positive anode tank that houses a positive electrolyte and a negative anode tank housing a negative electrolyte. The electrolytes in these tanks are pumped through a cell stack in opposite directions. The stack is broken down into an anode compartment for the positively charged electrolyte and a cathode compartment for the negatively charged electrolyte. These compartments are separated by an ion exchange membrane which allows charge carriers to move between the two electrolytes, but prevents mixing. Power can either be applied or extracted by changing the oxidation state of the electrolyte fluids (i.e. adding or removing electrons from the electrolyte).

Conventional flow batteries generally operate in three settings: charge, discharge, or off. However, like any mechanical system, components can become worn or damaged. In the case of flow batteries, the electrolyte itself can become unusable if, for example, the membrane become compromised and there is intermixing of the electrolytes. Currently, when a component fails, operators generally must replace the entire flow battery because there is no way to drain and refuel the system to allow for routine maintenance.

Accordingly, there is a need in the art for a flow battery system that provides significant cost savings to a user by allowing routine maintenance of system components without having to replace the electrolyte(s).

BRIEF SUMMARY OF THE INVENTION

It is the object of this invention to address the needs of the prior art by providing a flow battery system that includes components allowing for an additional fourth stage to drain and refuel the system without significantly altering the components or system of existing flow batteries. In this way, the invention can serve as an upgrade or retrofit to existing flow battery systems to improve longevity and overall efficiency of the system.

The flow battery system includes a positively charged tank comprising a positively charged electrolyte, a negatively charged tank comprising a negatively charged electrolyte, a cell stack comprising a positive electrode and a negative electrode separated by a membrane operable to allow permeation of an ion between the positive electrode and the negative electrode, a plurality of flow tubes connecting these components, a power source operable to provide an electric current to said electrodes, and a pump operable to pump electrolyte throughout the system. The additional stage of the system is made possible by the inclusion of a drainage tube and diverter that tie into the existing system and utilize the existing system's power source and pumps to pump electrolyte out of the system to allow for routine maintenance and repairs. Likewise, the cycle can be reversed and the pumps can be used to refuel the system by pulling electrolyte back into the system through the diverter.

In an alternative embodiment, the system includes a check valve that prevents contaminants from reentering the system during refueling.

In an alternative embodiment, the system includes a liquid detector that monitors the amount and/or level of electrolyte in each of the tanks.

In an alternative embodiment, the system includes a tank seal disposed at the base of the tank. The tank seal is operable to seal the outlet of the tank so that the tank can be refueled in accordance with embodiments of the invention.

In an alternative embodiment, a control module is used to control and operate the components of the system during discharge and refueling modes of operation.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

Figure 1:
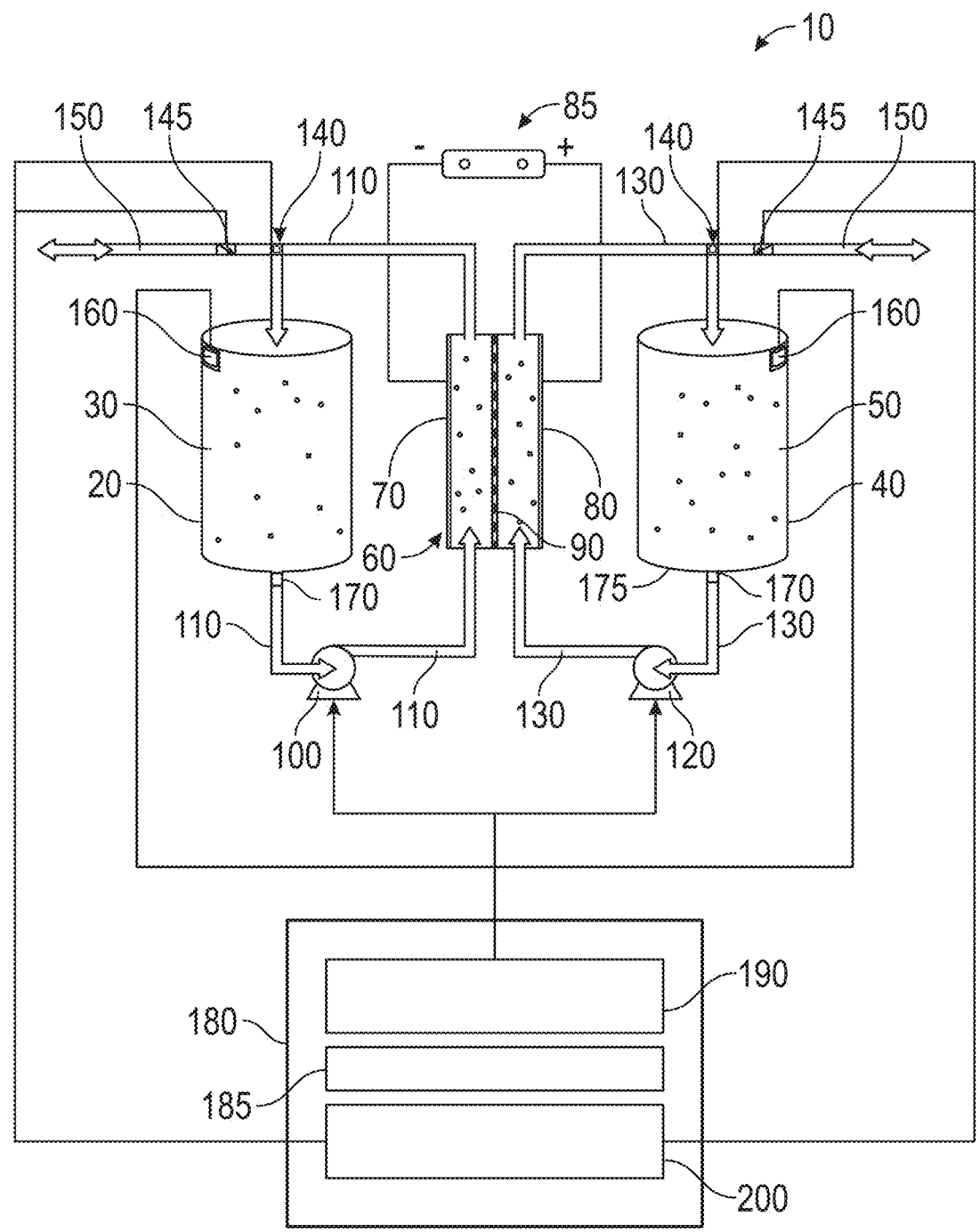
FIG. 1 is schematic of a flow battery system in accordance with one or more of the embodiments of the invention.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention. It is contemplated that features of one configuration may be beneficially incorporated in other configurations without further recitation.

DETAILED DESCRIPTION

For a further understanding of the nature and function of the embodiments, reference should be made to the following detailed description.

Turning to FIG. 1, the flow battery system 10 includes a positively charged tank 20 configured to house a positively charged electrolyte 30, a negatively charged tank 40 configured to house a negatively charged electrolyte 50, and at least one cell stack 60 having a positive electrode 70 and a negative electrode 80 separated by a membrane 90. The cell stack receives power from a power source 85. As shown by the arrows in FIG. 1, a pump 100 is used to pump the positively charged electrolyte 30 through the positively charged tank 20 and the positive electrode 70 via interconnected positive flow tubes 110. Similarly, a separate pump 120 (as shown in FIG. 1) is used to pump the negatively charged electrolyte 50 through the negatively charged tank 40 and the negative electrode 80 via interconnected negative flow tubes 130. While two separate pumps are depicted in FIG. 1, it is conceivable that one pump with separate tie in outlets for each electrolyte flow tube 110, 130 may be utilized. For purposes of this disclosure, when referring generally to "electrolyte" in the system 10, Applicant is referring to both the positively charged electrolyte 30 and the negatively charged electrolyte 50. Similarly, when referring generally to a pump in the system 10, Applicant is referring to either one of the two pumps 100, 120 depicted in FIG. 1, or alternatively, other pumping means (not shown)

but configured to pump electrolyte through the system 10. In the cell stack 60, as positively charged electrolyte 30 and negatively charged electrolyte 50 pass on either side of the membrane 90, shifting electrons pass through the membrane to either charge or discharge the electrolyte.

As shown in FIG. 1, the flow battery system 10 includes these known elements but improves upon existing systems by adding additional features that allow a user to perform maintenance repairs on the system 10 by allowing electrolyte to be diverted to a storage tank. Specifically, the system 10 includes a diverter 140 connected to the positive flow tube 110 and negative flow tube 130. The diverter 140 is operable to divert pumped electrolyte from the flow tubes 110, 130 to a drainage tube 150. For example, the diverter 140 may include a two-way valve with a control switch that controls and directs flow of the electrolyte either to the corresponding drainage tube 150 or the flow tubes 110, 130. The drainage tube 150 optionally can be connected to a separate storage container (not shown). In like fashion, either existing electrolyte or replacement electrolyte can be pumped back into the system 10 through the diverter 140 via the same drainage tube 150.

To aid in the removal of electrolyte to perform repairs, each of the tanks 20, 40 may include a liquid detector 160 operable to detect the amount of either positively charged electrolyte or negatively charged electrolyte. These liquid detectors 160 can be, for example, switches (e.g. float-type switches) or sensors designed to detect the liquid level or liquid amount (e.g. float-type, capacitance-type, optical, and ultrasonic sensors) in the tank.

To aid in the refueling of electrolyte to the tanks, each of the tanks 20,40 may include a tank seal 170, preferably disposed at the base 175 of the tank. The tank seal 170 is configured to seal the bottom of the tank and prevent any liquid from exiting into either the positive flow tube 110 or negative flow tube 130 during refueling. When electrolyte is being funneled back into the system 10, it is preferable that the electrolyte pass through a check valve 145 to prevent contaminants from entering the system 10.

As shown in FIG. 1, the preferred embodiment incorporates a control module 180 that is configured to communicate with the components of the system that regulate flow of fluid within the system 10. The control module 180 includes a pump controller 190 and a valve controller 200. The control module 180 includes a processor 185 that is operable to communicate with the pump controller 190 and valve controller 200. For this embodiment, the pump controller 190 is capable of turning the pumps 100,120 on or off in order to regulate the flow of electrolyte through the system 10. The valve controller 200 is operable to communicate with the liquid detectors 160 and control the diverters 140 and the check valves 145.

Figure 2:
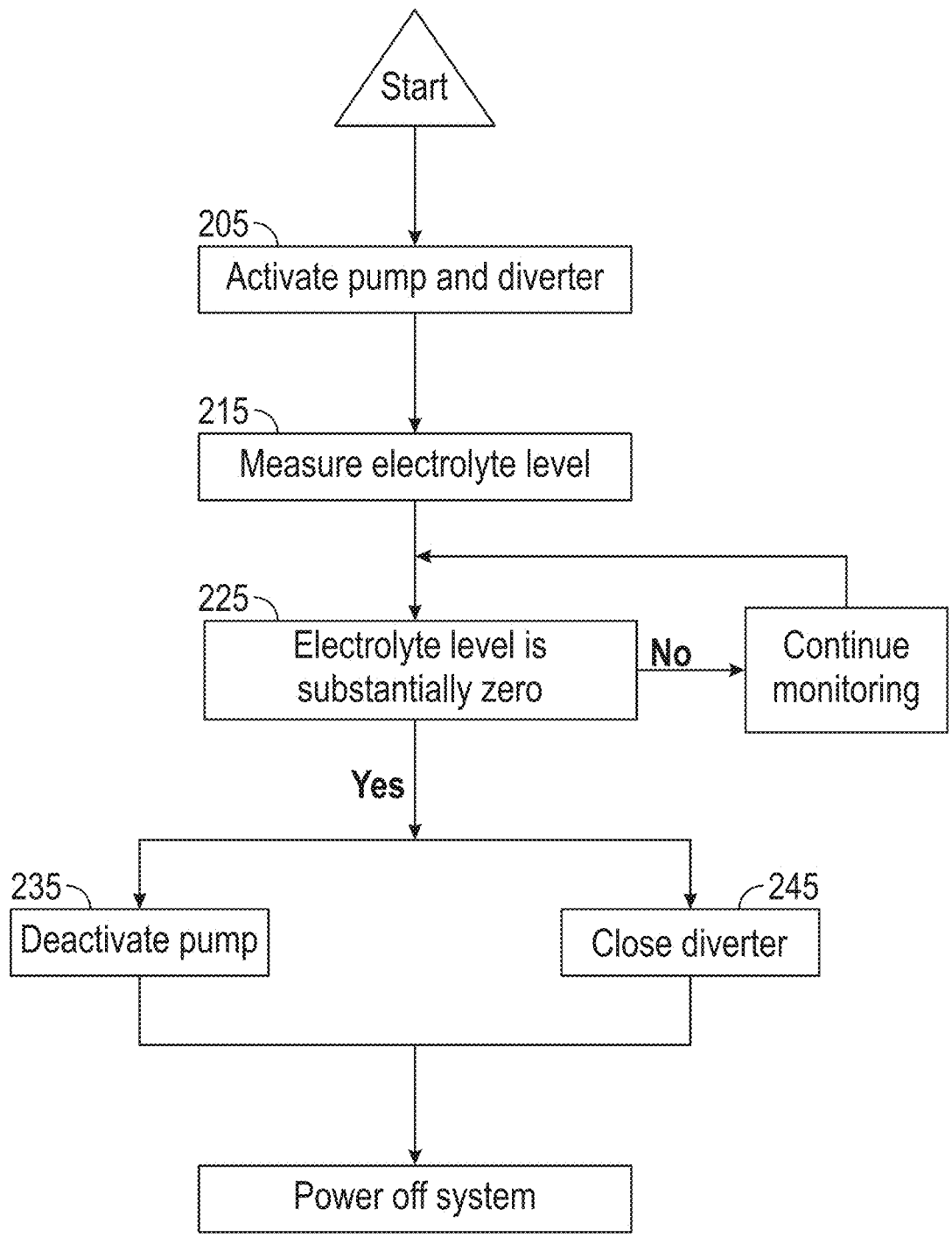
FIG. 2 shows an example method for operating the flow battery system of FIG. 1.

As shown in FIG. 2, a preferred method for draining the system 10 is shown. In operation, the first step 205 would involve the valve controller 200 opening the diverter 140 causing the pumped electrolyte to be diverted to the drainage tube 150. During this time, the next step 215 involves the liquid detector 160 measuring the amount of electrolyte in each tank and communicating the level of electrolyte to the processor 185 in the control module 180. In the third step 225, the liquid detector 160 indicates there is substantially no more electrolyte in the tank and sends a signal to the processor 185. Next, the processor 185 commands the valve controller 200 to close the diverter 140 in step 235 and also commands the pump controller 190 to turn off the pumps in step 245, resulting in the system 10 being turned to the "off" mode.

Figure 3:
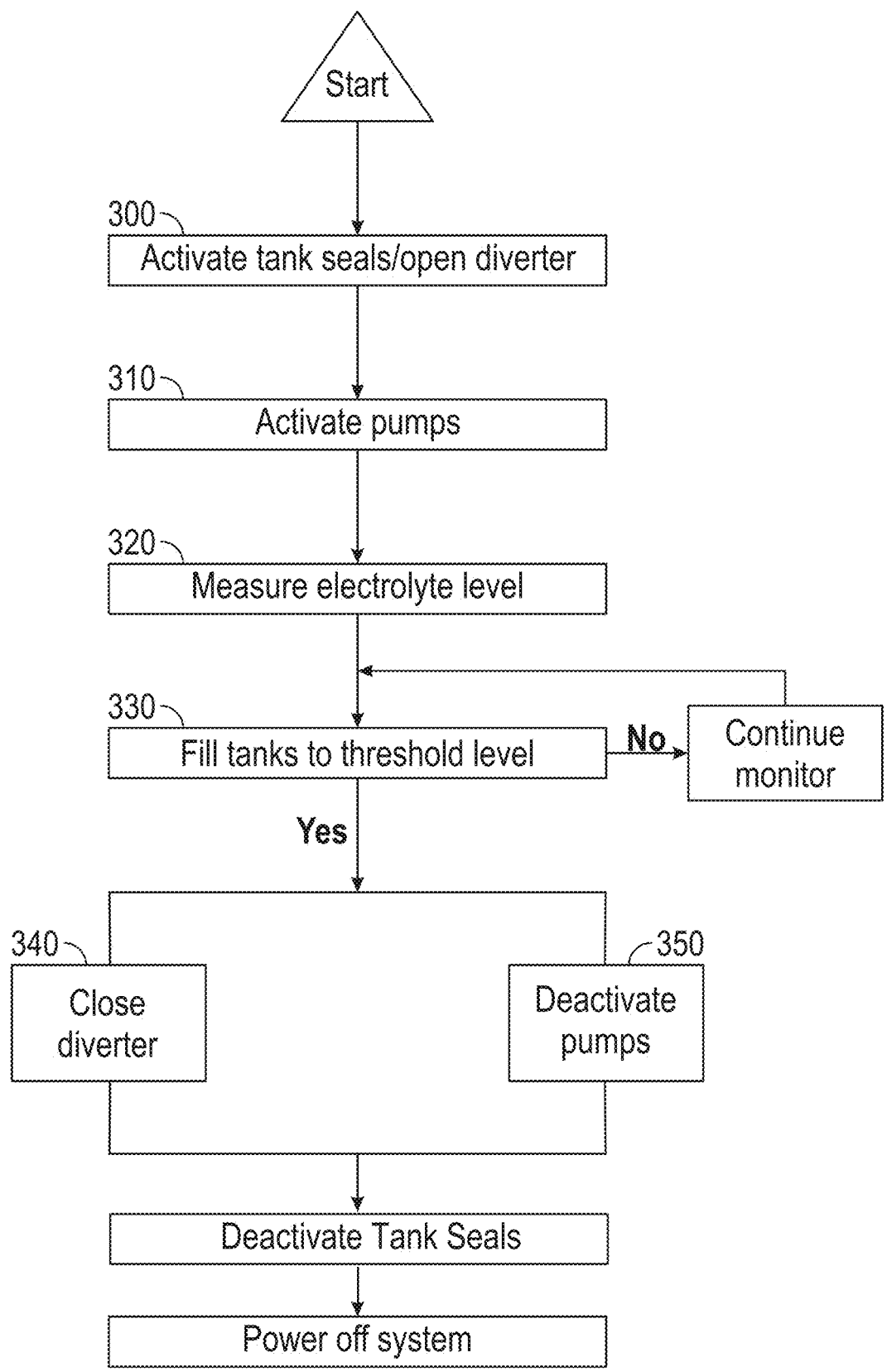
FIG. 3 shows an alternative example method for operating the flow battery system of FIG. 1.

As shown in FIG. 3, a preferred method for refueling the system 10 is shown. In operation, the first step 300 involves the processor 185 commanding the valve controller 200 to close the tank seals 170 and open the diverter 140 and open the check valve 145. The next step 310 involves turning on the pump(s) to pull electrolyte through the check valve 145 and diverter 140 back into the system 10. During this time, the next step 320 involves the liquid detector 160 measuring the amount of electrolyte in each tank and communicating the level of electrolyte to the processor 185 in the control module 180. In the third step 330, the liquid detector 160 indicates when the electrolyte in each tank has reached a threshold fill level and sends a signal to the processor 185. The preferred threshold fill level is a height sufficient to allow electrolyte to flow continuously through the system based on the size and dimensions of the system components and the force of the pumps. Next, the processor 185 commands the valve controller 200 to close the diverter 140 in step 340 and also commands with the pump controller 190 to turn off the pumps in step 350, resulting in the system 10 being turned to the "off" mode.

For the purpose of promoting an understanding of the principles of the invention, reference has been made to the embodiments illustrated in the drawings, and specific language has been used to describe these embodiments. However, this specific language intends no limitation of the scope of the invention, and the invention should be construed to encompass all embodiments that would normally occur to one of ordinary skill in the art. For example, the control module is defined as having a processor that communicates separately with a valve controller and pump controller; however, it is anticipated that in alternative embodiments the control module is operable to control each element of the system independently without the need of separate subpart controllers. The implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A flow battery system comprising:
   at least one positively charged tank having an inlet and an outlet and comprising a positively charged electrolyte, wherein the outlet is located at a base of the at least one positively charged tank;
   at least one negatively charged tank having an inlet and an outlet and comprising a negatively charged electrolyte, wherein the outlet is located at a base of the at least one negatively charged tank;
   at least one cell stack comprising a positive electrode and a negative electrode separated by a membrane operable to allow permeation of an ion between the positive electrode and the negative electrode;

a positive flow tube connecting the positively charged tank to the positive electrode;

a negative flow tube connecting the negatively charged tank to the negative electrode;

a tank seal located at the base of either the positively charged tank or the negatively charged tank, the tank seal being operable to seal the outlet of the positively charged tank or the outlet of the negatively charged tank to prevent flow of electrolyte from exiting the positively charged tank to the positive flow tube or exiting the negatively charged tank to the negative flow tube, a power source operable to provide an electric current to the positive electrode and the negative electrode;

a pump;

a drainage tube configured to transport the positively charged electrolyte or the negatively charged electrolyte into and out of the flow battery system; and a diverter coupled to either the positive flow tube or the negative flow tube, wherein the diverter is operable to divert flow of either the positively charged electrolyte or the negatively charged electrolyte from either the positive flow tube or the negative flow tube to the drainage tube.

2. The flow battery system of claim 1 comprising a check valve disposed at the drainage tube.

3. The flow battery system of claim 1 comprising a liquid detector operable to detect an amount of either the positively charged electrolyte or the negatively charged electrolyte.

4. The flow battery system of claim 3 wherein the liquid detector is a switch or sensor.

5. A flow battery system comprising:

a flow battery comprising, at least one positively charged tank having an inlet and an outlet and comprising a positively charged electrolyte, wherein the outlet is located at a base of the at least one positively charged tank;

at least one negatively charged tank having an inlet and an outlet and comprising a negatively charged electrolyte, wherein the outlet is located at a base of the at least one negatively charged tank;

at least one cell stack comprising a positive electrode and a negative electrode separated by a membrane operable to allow permeation of an ion between the positive electrode and the negative electrode;

a positive flow tube connecting the positively charged tank to the positive electrode;

a negative flow tube connecting the negatively charged tank to the negative electrode;

a tank seal located at the base of either the positively charged tank or the negatively charged tank, the tank seal being operable to seal the outlet of the positively charged tank or the outlet of the negatively charged tank to prevent flow of electrolyte from exiting the positively charged tank to the positive flow tube or exiting the negatively charged tank to the negative flow tube, a power source operable to provide an electric current to the positive electrode and the negative electrode;

a pump;

a drainage tube configured to transport the positively charged electrolyte or the negatively charged electrolyte into and out of the flow battery system;

a diverter coupled to either the positive flow tube or the negative flow tube; wherein the diverter is operable to divert flow of either the positively charged electrolyte or the negatively charged electrolyte from either the positive flow tube or the negative flow tube to the drainage tube;

a check valve disposed at the drainage tube; and a liquid detector operable to detect the amount of either the positively charged electrolyte or the negatively charged electrolyte; and a control module communicatively coupled to the flow battery and operable to actuate a plurality of settings for the flow battery.

6. The flow battery system of claim 5 wherein said control module is operable to actuate a charge setting for said flow battery.

7. The flow battery system of claim 5 wherein said control module is operable to actuate a discharge setting for said flow battery.

8. The flow battery system of claim 5 wherein said control module is operable to actuate an off setting for said flow battery.

9. The flow battery system of claim 5 wherein the control module is operable to actuate a drainage setting for the flow battery.

10. The flow battery system of claim 9 wherein the control module is operable to actuate the diverter to allow electrolyte to enter the drainage tube.

11. The flow battery system of claim 10 wherein the control module is communicatively coupled to the liquid detector and the pump, wherein the control module is operable to turn off the pump when the liquid detector detects a lack of fluid in the tank.

12. The flow battery system of claim 5 wherein said control module is operable to actuate a refueling setting for flow battery.

13. The flow battery system of claim 12 wherein said control module is operable to actuate said tank seal.

14. The flow battery system of claim 10 wherein the control module is communicatively coupled to the liquid detector and the pump, wherein the control module is operable to actuate the pump and remove the tank seal when the liquid detector detects a predetermined level of fluid in the tank.

* * * * *